(12) United States Patent
Rhême et al.

(10) Patent No.: US 8,192,319 B2
(45) Date of Patent: Jun. 5, 2012

(54) GEAR UNIT AND USE OF THE SAME

(75) Inventors: Charles Rhême, Posieux (CH); Peter Heimlicher, Fribourg (CH); Roland Bochud, Norèaz (CH)

(73) Assignee: Optosys SA (CH)

( * ) Notice: Subject to any disclaimer, the term of this patent is extended or adjusted under 35 U.S.C. 154(b) by 1193 days.

(21) Appl. No.: 11/966,173

(22) Filed: Dec. 28, 2007

(65) Prior Publication Data

US 2008/0261744 A1   Oct. 23, 2008

(30) Foreign Application Priority Data

Jan. 15, 2007   (EP) ..................................... 07405011

(51) Int. Cl.
*F16H 13/08*   (2006.01)
(52) U.S. Cl. ....................................................... 475/196
(58) Field of Classification Search .................. 475/196, 475/331, 348, 183, 189, 190, 191, 192, 214, 475/303, 89
See application file for complete search history.

(56) References Cited

U.S. PATENT DOCUMENTS

| | | | | |
|---|---|---|---|---|
| 2,289,066 A | * | 7/1942 | Olson | 411/163 |
| 2,935,714 A | * | 5/1960 | Barden et al. | 338/157 |
| 4,032,880 A | * | 6/1977 | Di Michele et al. | 338/157 |
| 4,711,434 A | * | 12/1987 | Haag | 267/161 |
| 5,952,912 A | * | 9/1999 | Bauer et al. | 338/162 |

FOREIGN PATENT DOCUMENTS

EP   GB 550234   6/1941

\* cited by examiner

*Primary Examiner* — David D Le
*Assistant Examiner* — David J Hlavka
(74) *Attorney, Agent, or Firm* — Ostrolenk Faber LLP

(57) ABSTRACT

The gear unit for use with a manually adjustable electric component has a manually operable adjusting shaft and a reduction gear including a rotatable ball cage and a plurality of balls as well as a race ring element having a spring and retaining portion that encircles the race ring externally. Such a gear unit allows greatly reduced dimensions and furthermore offers a considerable dielectric strength.

15 Claims, 2 Drawing Sheets

GEAR UNIT AND USE OF THE SAME

FIELD OF THE INVENTION

The invention relates to a gear unit for combination with a manually adjustable electric component and having a reduction gear, as well as to the use of the same. The dependent claims indicate particular embodiments of the invention.

PRIOR ART

Reduction gears for a more precise adjustment of manually operable electric/electronic equipment have been known in the art for decades. Thus, for example, GB 550 234 of 1942 shows such a gear for adjusting a variable capacitor, i.e. for tuning a radio set. This gear comprises an adjusting shaft that is rotatable by means of a turning knob and has a groove-shaped recessed drive portion. Balls are frictionally arranged in the latter and externally engage with a fixed race ring in a frictional manner also. The balls are guided by a ball cage that is non-rotationally secured to the shaft of a variable capacitor by means of a set screw. When the adjusting shaft is turned, the balls forcibly revolve both on the drive portion and on the race ring, thereby carrying along the ball cage as well as the variable capacitor at a reduced angular speed.

A comparable more recent reduction gear of the same kind is described in U.S. Pat. No. 2,935,714 of 1960. In the latter, a helical spring is provided to increase the adhesion pressure between the balls and the tracks.

The mentioned reduction gears and various other reduction gears of this kind that are not explicitly mentioned here are consistently composed of punched and bent sheet metal parts. They form integral parts of the respective complex apparatus they are associated to, mostly radio receivers based on electron tubes.

SUMMARY OF THE INVENTION

On this background, it is the object of the invention to provide a gear unit using the mentioned kind of reduction gears that has a modern electric/electronic construction and corresponding dimensions which do not substantially exceed a size of 1×1×1 cm. Furthermore, the unit should be readily combinable with different electric/electronic components and fully compliant with EMC standards regarding dielectric strength.

This is accomplished by a gear unit comprising a manually operable adjusting shaft and a reduction gear including a rotatable ball cage and a plurality of balls as well as a race ring element having a spring and retaining portion that encircles the race ring externally. This gear unit forms a self-contained mechanical element that is suitable for combination with components on circuit boards, more particularly with rotary potentiometers.

In a preferred embodiment, the gear unit is rugged and impermeable to splash water and thus suitable for rough operating conditions. To this end, the gear unit according to claim 2 is provided with an enclosure unit that ensures a reliable protection of the interior components from all exterior influences. Moreover, the unit is resistant to shocks as it comprises no parts having any free play between them.

BRIEF DESCRIPTION OF THE DRAWINGS

The invention will be described in more detail hereinafter with reference to an exemplary embodiment.

FIG. 1 shows an exploded perspective view of gear unit 11 and of an electric/electronic component 12 coupled thereto, more particularly a rotary resistor or a rotary potentiometer. This component 12 is adapted to be mounted on a non-represented plane circuit board on which e.g. two light emitting diodes (LEDs) 13, 14 may further be mounted. Adjusting axle 16 of electric component 12 has a slot 15 permitting a manual adjustment thereof, in which e.g. a screwdriver is insertable.

Figure 1:
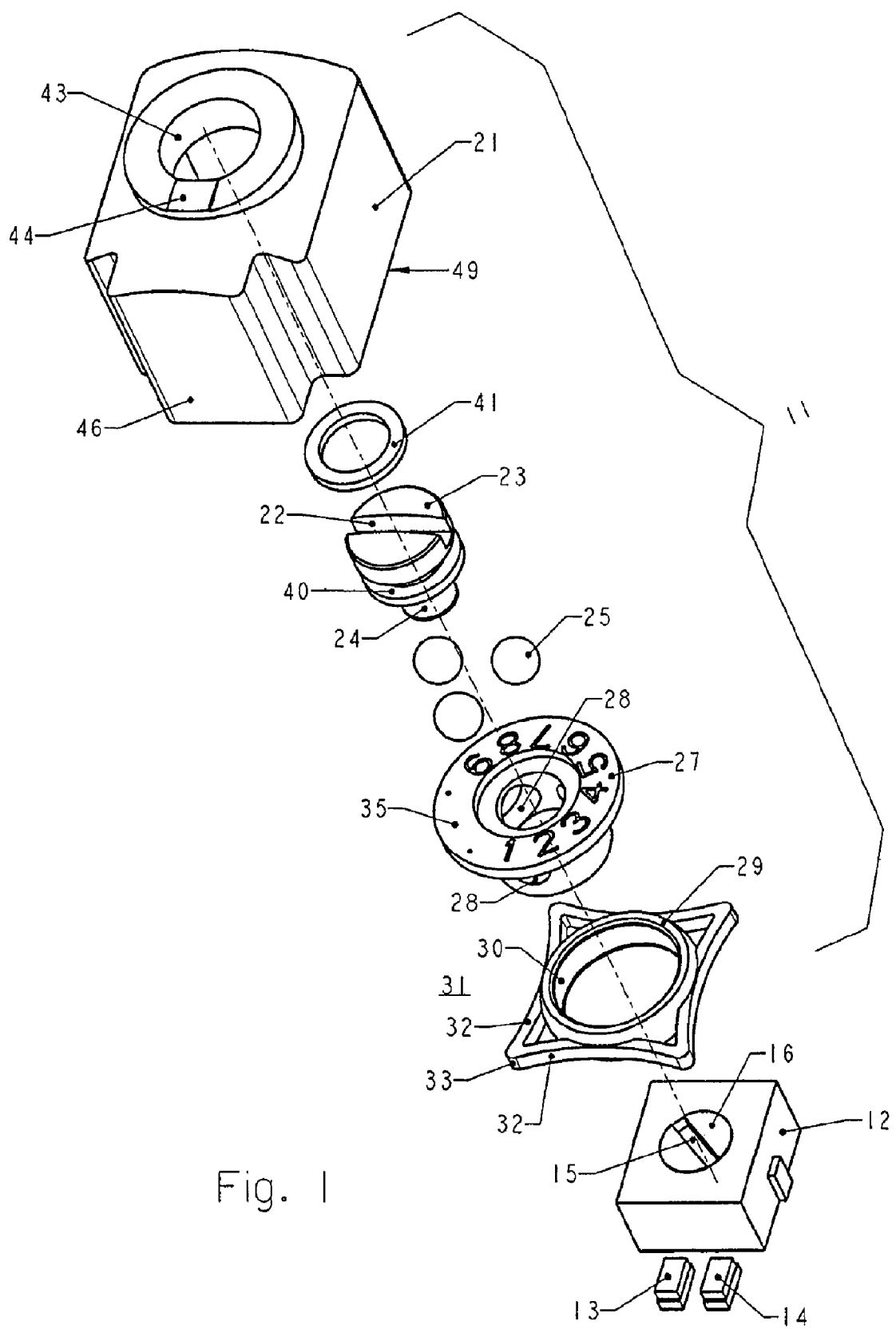
FIG. 1 shows an exploded perspective view of a gear unit according to the invention.

Gear unit 11 mainly includes an enclosure unit 21, an adjusting shaft 23, three balls 25, a ball cage 27 and a race ring element 29.

Figure 2:
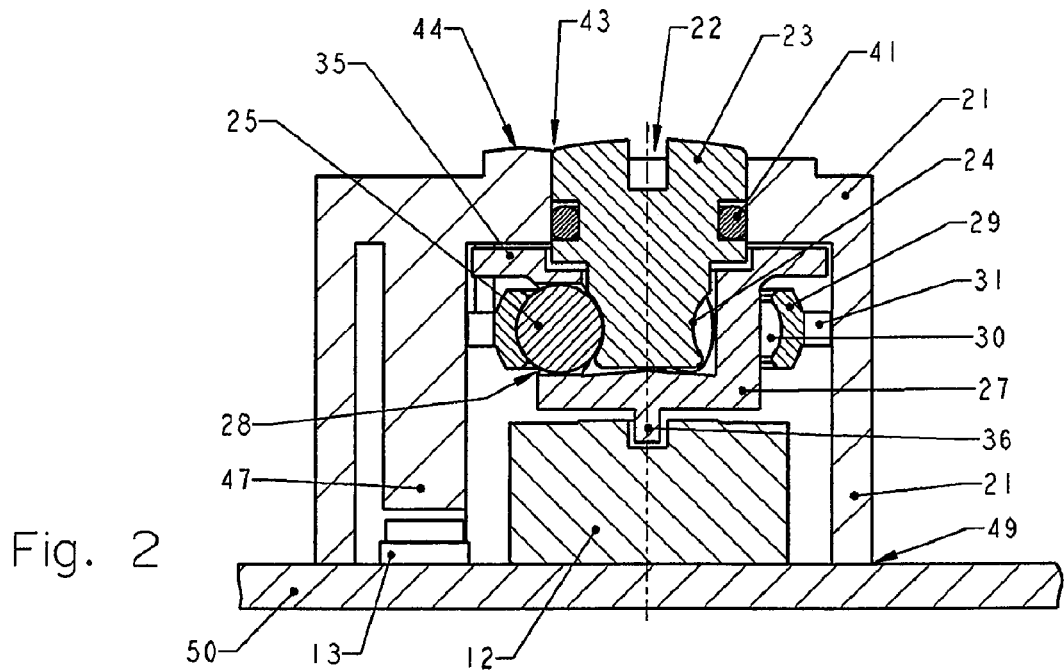
FIG. 2 shows a central cross-section of the assembled gear unit of FIG. 1.

In FIG. 2, gear unit 11 is shown in the assembled state. The drive portion 24 of adjusting shaft 23, the running surface 30' of race ring element 29, the ball cage 27 having radially extending transversal bores 28 and the balls 25 that are guided in transversal bores 28 and maintained between drive portion 24 and running surface 30' with a slight pressure, together form a reduction gear.

Ball cage 27 has a cylindrical section in which the transversal bores 28 are arranged in radial direction, preferably three such bores. Ball cage 27 further comprises a dial 35 having a scale formed of a series of consecutive numbers and a coupling element 36, particularly in the form of a screwdriver tip intended to engage in driving slot 15 of electric component 12.

As the simplest type of an input means, a slot 22 serves for rotating adjusting shaft 23 of gear unit 11. Shaft 23 further has an annular groove 40 in which an elastic ring 41, e.g. a commercially available O-ring is inserted.

Adjusting shaft 23 with its O-ring 41 is received rotatably and, most importantly, impermeably to splash water in an opening 43 of enclosure 21. Next to opening 43, enclosure 21 has a transparent area 44 through which a respective numeral of dial 35 is visible.

In its interior, enclosure 21 has a fixture for race ring element 29 that maintains running surface 30', orthogonally and centrally with respect to adjusting shaft 23, in a rotationally fixed and elastic manner. To this end, race ring element 29 has four spring portions 31 each of which has two spring legs 32 and a common apex 33. Legs 32 are bent outwards concavely. They connect to race ring 30 tangentially and thus at a flat angle, while legs 32 include an angle of less than 90° at apexes 33.

This construction results in relatively large spring portions and a firm fixation in the orthogonal inner edges of enclosure unit 21. The dimensions are chosen such that apexes 33 are aligned in the edges in such a manner that approximately equal elastic forces build up in all spring legs 32, which together press the race ring 30 radially inwards. This creates a pressure that slightly compresses the balls 25 between running surface 30' and drive area 24, thereby providing a firm frictional contact of the balls that is consistently maintained over long periods and under varying conditions, especially temperature variations.

For certain embodiments and materials it may be advantageous or necessary to produce greater frictional forces between the balls and the running surface, e.g. by treating or roughening the surface of the balls.

For a better guidance of balls 25, both drive portion 24 and running surface 30' are each concavely recessed in cross-section in the direction of balls 25. Furthermore, these recesses improve the overall cohesion of the assembled gear unit 11.

Adjusting shaft 23 is preferably made of metal, particularly for reasons of durability and stability. For the same reasons, the balls 25 are also made of metal, especially of steel. In contrast thereto, ball cage 27, race ring element 29 and enclosure unit 21 are injection-molded parts of an electrically nonconductive plastics material.

The construction of gear unit 11 from such materials results in low manufacturing costs, a long service life, and especially a very considerable dielectric strength of several kilovolts that complies with EMC standards. Furthermore, this construction allows a miniaturization of the gear unit down to dimensions of approx. 1×1×1 cm or less.

Figure 3:
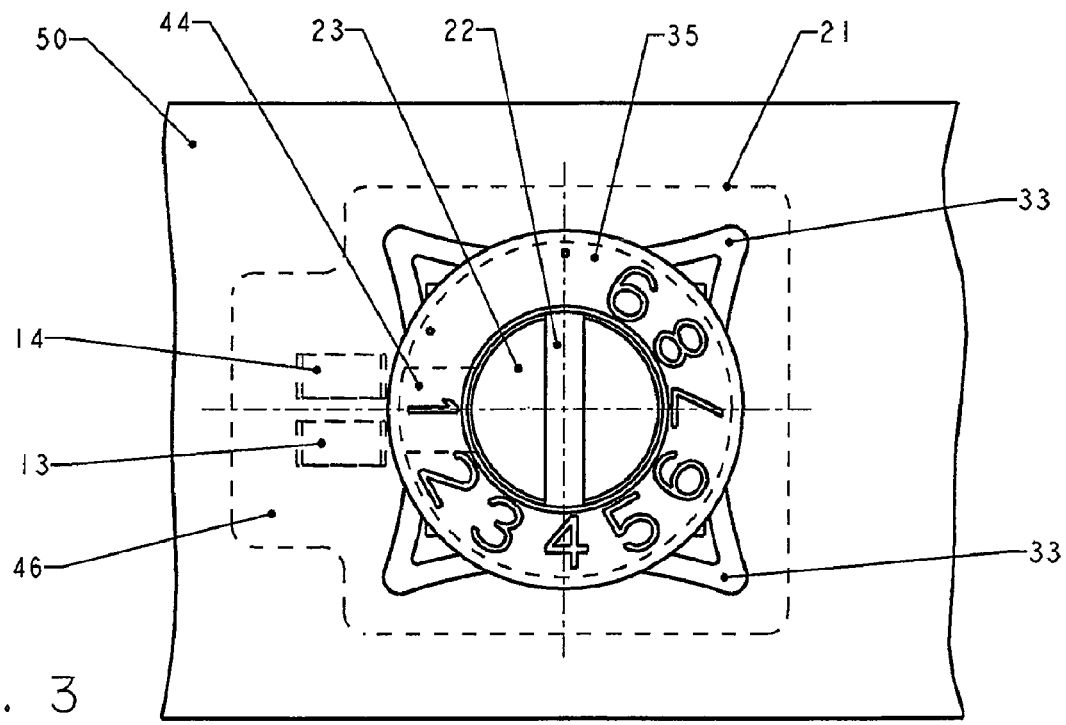
FIG. 3 shows a top view of the gear unit of FIG. 1.

Enclosure unit 21 may be cylindrical, cubical, or cubical with a lateral projection 46 as shown in FIGS. 1 to 3. Preferentially, beside the end of adjusting shaft 23 and its slot 22, enclosure unit 21 has a window 44 through which a respective numeral of dial 35 is visible.

Adjacent to this window 44, another transparent area may be provided through which and through an adjoining light guide 47 the light emitted by light emitting diodes 13, 14 is visible. It is also an option to use a transparent plastics material for enclosure unit 21.

Enclosure unit 21 is open at the bottom and terminated by a plane, continuous lower edge 49 allowing it to rest flush on component support 50 of electric component 12.

The mounting procedure is as follows: After fastening electric component 12 and possibly light emitting diodes 13, 14 to component support 50, the assembled gear unit 11 is pushed over component 12 in such a manner that coupling element 36 will engage in slot 15. At the end of the assembly, enclosure unit 21 rests on component support 50 with its lower edge 49 in a planar manner and completely encloses component 12. In this position, unit 11 is attached to support 50, e.g. by means of an adhesive, by pins on lower edge 49 and associated bores in support 50, or by jamming with component 12.

However, enclosure unit 21 may also be manufactured integrally with the enclosure of the instrument or apparatus in which the operated electric/electronic components are incorporated. In this case, the gear unit is built into this enclosure unit in an analogous manner as described above.

A large number of variants of the described gear unit are possible. Some of these variants will be enumerated below:

Balls 25 may be made from glass, sapphire, or a ceramic material. In this case, an increase of the dielectric strength will result.

Adjusting shaft 23 may be made from plastics material.

Race ring element 29 may be composed of a separate race ring 30 and a distinct retaining and spring portion 31. For example, this portion 31 might be made of bent spring steel and snapped onto race ring 30. Furthermore, variants are possible in the design and the number of spring legs 32 and apexes 33, however without yielding any fundamental improvements over the described embodiment.

Dial 35 and the way of reading it may be varied, e.g. by using a division scale.

By varying the dimensions of the diameters of drive portion 24, of race ring 30 and of balls 25, the reduction ratio can be varied. A rotation ratio of 4:1 can be achieved without problems.

The rotatable support of adjusting shaft 23 in bearing opening 43 can be realized in another manner than by means of an O-ring 41, e.g. by a bearing sleeve.

Gear unit 11 according to the invention meets all the requirements mentioned in the introduction, especially robustness, dielectric strength, simple mountability, long-term durability also in rough environments.

An additional advantage is that gear unit 11 has no end stops. This allows utilizing the full variation range of the associated electric/electronic component 12.

The invention claimed is:

1. A gear unit for use with a manually adjustable electric component, comprising:
   a manually operable adjusting shaft; and
   a reduction gear including a rotatable ball cage and a plurality of balls as well as a race ring element,
   a spring and retaining portion that encircles said race ring externally,
   said spring and retaining portion further comprising groups of two spring legs each, which are bent outwards concavely, which connect to said race ring element tangentially, and pairs of which end in respective apexes whose enclosed angle is significantly smaller than 90°.

2. The gear unit of claim 1, further comprising an enclosure unit having a U-shaped cross-section that is provided in the bend of the U with a bearing opening for supporting said adjusting shaft and in its interior with retaining elements for fastening said race ring element.

3. The gear unit of claim 2, wherein a sealing means is arranged between said adjusting shaft and said enclosure unit.

4. The gear unit of claim 1, wherein four symmetrically arranged groups of two spring legs each are provided which form a homogenous unit together with said race ring.

5. The gear unit of claim 1, wherein the race ring element includes a running surface that is concavely recessed in cross-section.

6. The gear unit of claim 1, wherein said reduction gear has a rotatable drive portion and a stationary running surface and said rotatable ball cage is provided with a coupling element for connection to said electric component, and said balls are guided by said ball cage and arranged between said drive portion and said running surface in a two-sided driving manner.

7. The gear unit of claim 1, wherein said race ring element includes a central race ring having an inwardly facing running surface.

8. The gear unit of claim 2, wherein said enclosure unit has four orthogonal corner edges in its interior into which said race ring element is insertable with the apexes of the spring legs of the race ring element aligned to the four orthogonal corner edges, the dimensions being chosen such that a spring tension builds up in the spring legs.

9. The gear unit of claim 2, wherein said adjusting shaft is a metal part and said ball cage, said race ring element and said enclosure unit are injection-molded plastics parts that provide electric insulation.

10. The gear unit of claim 9, wherein at least a portion of the enclosure unit is transparent.

11. The gear unit of claim 9, wherein the maximum dimensions of said enclosure unit are in the order of 1×1×1 cm.

12. The gear unit of claim 1, wherein the surface of said balls is treated in order to achieve an increased friction.

13. A method of using of the gear unit of claim 1, the method comprising:
   fastening said manually adjustable electric component to an electronic component support, and
   pushing said gear unit over said adjustable electric component in such a manner that the coupling element connects to said component and until the lower edges of said enclosure unit contact the component support in a planar manner and connect thereto by a connecting means.

14. The method of claim 13, wherein said connecting means is an adhesive.

15. The method of claim 13, wherein said connecting means includes pegs on the lower edges of said enclosure unit and associated bores in said component support.

* * * * *